Sept. 27, 1927.  W. A. HOWELL  1,643,891
HAND GRIP
Filed Jan. 21, 1927
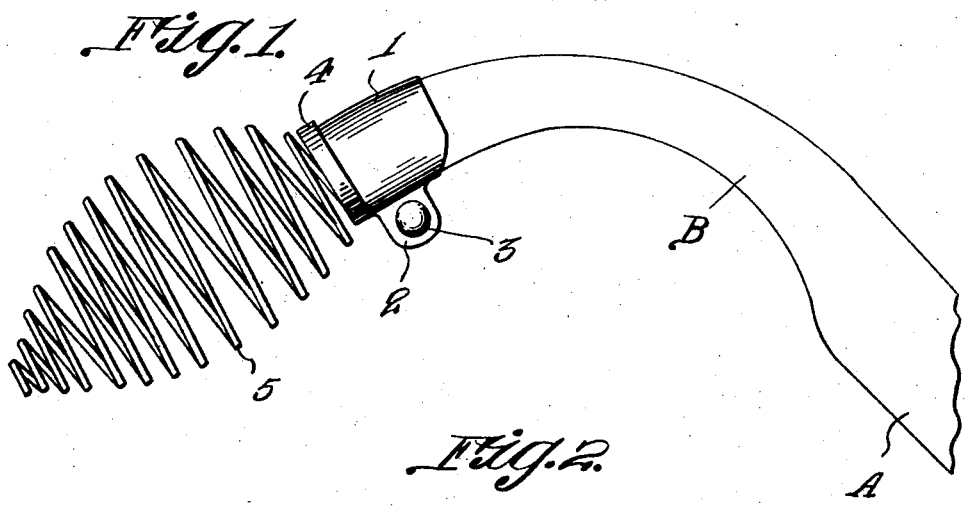
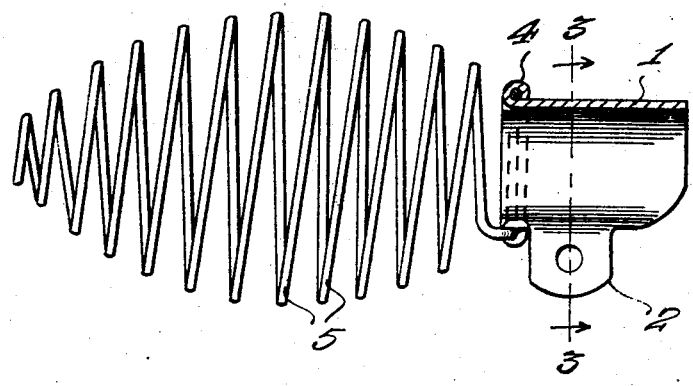
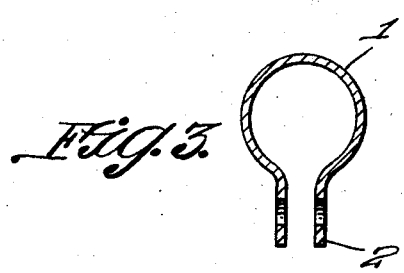
W. A. Howell,
INVENTOR Patented Sept. 27, 1927.

1,643,891

UNITED STATES PATENT OFFICE.

WILLIE A. HOWELL, OF JAYESS, MISSISSIPPI.

HAND GRIP.

Application filed January 21, 1927. Serial No. 162,645.

This invention relates to handle attachments and especially to a grip for handles of ground working implements such as plows, cultivators or the like.

The primary object of the invention is to provide a grip for plow and cultivator handles that will absorb all shocks caused by the ground working parts thereof contacting with obstructions such as roots, stumps, stones or the like and thereby afford protection and prevent injury to the user.

A further object of the invention is to provide a grip for handles of ground working implements that can be expeditiously secured to the handles without altering the construction thereof.

Another object of the invention is to provide a grip for the purpose set forth that is simple in construction and inexpensive to manufacture.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a side elevation of my novel handle grip and showing the same applied to a plow handle.

Figure 2 is a view of the grip per se and showing the handle clamp in section.

Figure 3 is a sectional view taken on line 3—3 of Figure 2.

Referring to the drawings in detail the letter A indicates a plow or cultivator handle having the usual curved reduced portion B providing the customary hand hold for the handle, and to which is adapted to be secured my novel grip which includes a split sleeve 1 formed of resilient material and extending in parallelism from the confronting edges of the split sleeve are spaced apertured ears 2 adapted to receive a bolt and nut connection 3 for clamping the grip to the portion B as clearly shown in Figure 1 of the drawings.

Formed on the outer edge of the split sleeve 1 is a bead 4 which secures one end convolution of a coil spring 5 to the sleeve as shown in Figure 2. The coil spring is formed in a manner so that the convolutions diminish in size from the center thereof to its ends thereby providing a comfortable gripping surface as will be readily apparent.

From the above description and disclosure in the drawings it will be obvious that I have provided a hand grip for handles of ground working implements that will absorb shocks and rebounds caused by the ground working parts of the implements coming in contact with obstructions, therefore my novel grip will afford adequate protection and prevent injury to the user of the implements equipped therewith.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A hand grip of the character described comprising a clamp, including a bead, and a coil spring having its convolutions diminishing in size from its center thereof and having one of its end convolutions secured in said bead.

In testimony whereof I affix my signature.

WILLIE A. HOWELL.